United States Patent
Han et al.

(10) Patent No.: US 11,722,898 B2
(45) Date of Patent: Aug. 8, 2023

(54) DETECTION AND DEFENSE SYSTEM OF A NETWORK CREDENTIAL SHARING APPLICATION

(71) Applicant: HEWLETT PACKARD ENTERPRISE DEVELOPMENT LP, Houston, TX (US)

(72) Inventors: Jianpo Han, Beijing (CN); Yafeng Jiang, Beijing (CN); Guangzhi Ran, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 35 days.

(21) Appl. No.: 17/385,652

(22) Filed: Jul. 26, 2021

(65) Prior Publication Data
US 2023/0027153 A1 Jan. 26, 2023

(51) Int. Cl.
*H04L 29/06* (2006.01)
*H04W 12/121* (2021.01)
*H04L 9/40* (2022.01)

(52) U.S. Cl.
CPC ......... *H04W 12/121* (2021.01); *H04L 63/029* (2013.01)

(58) Field of Classification Search
CPC .......................... H04W 12/121; H04L 63/029
See application file for complete search history.

(56) References Cited

U.S. PATENT DOCUMENTS 9,055,062 B1 * 6/2015 Huang ................ H04W 12/06
11,477,829 B2 * 10/2022 Huang ............... H04W 68/005
(Continued)

FOREIGN PATENT DOCUMENTS

WO WO-2018122076 A1 * 7/2018 ......... H04L 41/0803
WO WO-2019053724 A1 * 3/2019 ............. G06F 21/55

OTHER PUBLICATIONS

Ye et al. "Retrofitting Security and Privacy Measures to Smart Home Devices", 2019 Sixth International Conference on Internet of Things: Systems, Management and Security (IOTSMS), (Year: 2019).*

(Continued)

*Primary Examiner* — Morshed Mehedi
(74) *Attorney, Agent, or Firm* — Sheppard Mullin Richter & Hampton LLP

(57) ABSTRACT

Systems and methods are provided for a detection and defense system relating to a network connection sharing application. For example, the system can simulate a request for a network password using a conventional application that shares this information. The application may be implemented on, for example, a mobile device or a virtual machine (VM). In some embodiments, the mobile device/VM attempts to establish a network connection to an access point (AP) using the shared password over a tunnel established between the AP and mobile device/VM. If the mobile device/VM can connect to the AP, an assumption may be made that the user credentials have been leaked and a potential security risk exists. An alert can be sent to a network administrator of the communication network (e.g., to perform an action, etc.). The action may include, for example, changing the password, removing access from one or more users, and the like.

19 Claims, 7 Drawing Sheets

(56) References Cited

U.S. PATENT DOCUMENTS

| | | | |
|---|---|---|---|
| 2008/0089287 A1* | 4/2008 | Sagfors | H04W 36/026 370/331 |
| 2011/0078793 A1* | 3/2011 | Orgill | H04W 12/122 726/22 |
| 2012/0044914 A1* | 2/2012 | Chen | H04W 12/08 370/338 |
| 2013/0086665 A1* | 4/2013 | Filippi | H04W 12/062 726/7 |
| 2017/0034669 A1* | 2/2017 | Dronadula | H04L 43/20 |
| 2018/0013724 A1* | 1/2018 | Row, II | H04W 76/10 |
| 2018/0020353 A1* | 1/2018 | Bhandaru | H04L 9/088 |
| 2019/0052554 A1* | 2/2019 | Mukerji | H04L 41/0893 |
| 2019/0190729 A1* | 6/2019 | Levy-Abegnoli | H04L 12/185 |
| 2019/0335324 A1* | 10/2019 | Ringland | H04L 61/5007 |
| 2020/0045541 A1* | 2/2020 | Kreishan | H04W 12/06 |

OTHER PUBLICATIONS

Wikipedia, "WiFi Master Key", available online at <https://en.wikipedia.org/w/index.php?title=WiFi_Master_Key&oldid=922298796>, Oct. 21, 2019, 5 pages.

* cited by examiner

DETECTION AND DEFENSE SYSTEM OF A NETWORK CREDENTIAL SHARING APPLICATION

BACKGROUND

Various standalone applications can be downloaded to a standard mobile device to enhance the functionality of the mobile device. One such application can detect available communication networks and offer login credentials to connect with those networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
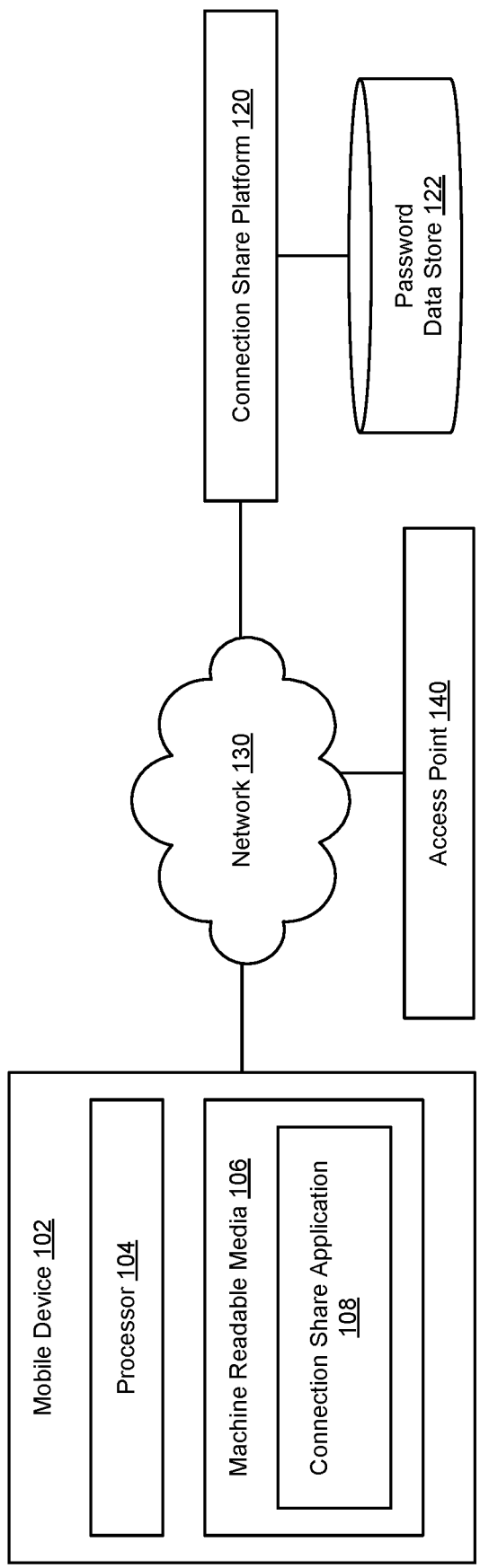
FIG. 1 provides an illustrative collection of devices in a communication network, in accordance with embodiments of the application.

The figures are not exhaustive and do not limit the present disclosure to the precise form disclosed.

DETAILED DESCRIPTION

As noted, standalone applications can be downloaded to a standard mobile device to enhance the functionality of the mobile device. One such application can detect available communication networks and offer login credentials to connect with those networks. However, when the mobile device is able to connect with the communication networks using the login credentials available from the application, other devices are presumably able to connect as well. This offers little security for data that is transmitted via the communication network and can put the mobile device at an elevated risk of access by a fraudster. Better methods are needed.

Mobile devices may connect to available communication networks (e.g., Wi-Fi communication network, etc.) using the application downloaded to the mobile device. The application may help provide the mobile device with access to a passwords data store, and the mobile device can provide a password from the data store to authenticate the mobile device with the network. Each of the passwords in the data store may correspond with an available communication network. When the mobile device identifies a communication network, the application may match the identified communication network with a stored communication network and its corresponding password in the passwords data store. The password may be returned to the mobile device and the mobile device can provide the password to the communication network for access to it.

To populate the data store of passwords, the application may receive passwords from other mobile devices for each communication network. These received passwords may be stored in the passwords data store for future use by other mobile devices. This process may share passwords between mobile devices without direct communications between the mobile devices. While the mobile devices are enhanced with functionality to access additional communication networks, the process introduces severe security vulnerabilities to the communication networks corresponding with the shared passwords, since any device with access to the passwords data store can gain access to the networks.

Some communication networks have enhanced security features to help prevent the use of shared passwords. For example, the communication network may require user credential information, including a service set identifier (SSID) name, basic service set identifiers (BSSID), passphrase, username (e.g., when activating enterprise mode), Wi-Fi access point geolocation, etc. However, these security features may not prevent fraudulent access. For example, the application may receive the user credential information and store it with the passwords data store. The application downloaded to the mobile device may retrieve the password and the user credential information to access the enhanced communication network (e.g., to mimic an authenticated mobile device with unique user credentials). Fraudulent access to the user credential information may further endanger the mobile device that originated the user credential information, allowing fraudsters to decode encrypted traffic using the leaked credentials. For enterprise users, sharing enterprise account information or user credential information may be fatal to network security.

Embodiments described herein address the technical problems discussed above and provide a detection and defense system relating to a network connection sharing application. For example, the system can simulate a request for a network password and/or user credentials (e.g., from a public cloud repository) using a conventional application that shares communication network passwords and user credentials. The conventional application may be implemented on, for example, a mobile device or a virtual machine (VM) executed on a remote server computer. In some embodiments, either the mobile device or the VM attempts to establish a network connection to an access point (AP) using the shared user credentials over a dedicated communication tunnel established between the AP and mobile device/VM. The connection may implement a remote Wi-Fi mirror to help keep the AP uncompromised. If the mobile device/VM can connect to the AP, an assumption may be made that the user credentials have been leaked (e.g., stored in a password data store of the application) and a potential security risk exists. An alert can be sent to a network administrator of the communication network (e.g., to perform an action, etc.). The action may include, for example, changing the user credentials (e.g., passphrase, etc.), removing access from one or more users, and the like.

Technical advantages are realized throughout the application. For example, network security to shared communication networks can be improved and impermissible access to user data may be reduced. For example, by assuming that the user credentials have been leaked when the mobile device/VM can connect to the AP, the improved system reduces the number of steps required to identify a potential security breach. The mobile device, VM, and/or the AP are automatically enabled to report the security risk, thereby implementing increased network security in a new and automated process.

FIG. 1 provides an illustrative collection of devices in a communication network, in accordance with embodiments of the application. In a traditional access process, the collection of devices may communicate with each other to gain access to the communication network. For example, mobile device 102 may access connection share platform 120 via network 130. Mobile device 102 may include processor 104 in communication with machine readable media 106. The machine readable media 106 may store one or more applications for requesting, downloading, and installing applications to enhance the functionality of mobile device 102. In some examples, mobile device 102 may be a wireless computing device that accesses a wired communication network via access point (AP) 140, depending on the setup of the communication network (e.g., a mobile phone, laptop, desktop, etc.).

Processor 104 may be one or more central processing units (CPUs), semiconductor-based microprocessors, and/or other hardware devices suitable for retrieval and execution of instructions stored in machine-readable storage medium 106. Processor 104 may fetch, decode, and execute instructions to control processes or operations for optimizing the system during run-time. As an alternative or in addition to retrieving and executing instructions, processor 104 may include one or more electronic circuits that include electronic components for performing the functionality of one or more instructions, such as a field programmable gate array (FPGA), application specific integrated circuit (ASIC), or other electronic circuits.

Machine readable media 106 may be any electronic, magnetic, optical, or other physical storage device that contains or stores executable instructions. Thus, machine-readable storage medium 106 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 106 may be a non-transitory storage medium, where the term "non-transitory" does not encompass transitory propagating signals. As described in detail below, machine-readable storage medium 106 may be encoded with executable instructions for running various processes and engines described throughout the disclosure.

Connection share application 108 may be incorporated with mobile device 102 for detecting and submitting a password and/or user credentials to a communication network to gain access to the network. To install connection share application 108, mobile device 102 may communicate with connection share platform 120 that is hosted at a remote server. Connection share platform 120 may provide applications to users, including to request connection share application 108. Mobile device 102 may download and store connection share application 108 from connection share platform 120.

When activated, connection share application 108 may access a password data store 122 associated with connection share platform 120. The password data store 122 may correspond with a public cloud repository that is accessible using a conventional application that shares communication network passwords and user credentials stored within password data store 122. The request and response protocol between connection share platform 120 and connection share application 108 may be embedded with connection share application 108 and executed by processor 104. Connection share application 108 may retrieve a password and/or user credentials associated with a communication network and provide the retrieved information to the network for authentication purposes.

As an illustration, mobile device 102 may encounter a new communication network and identify that a connection to the communication network requires a password and/or user credentials. Mobile device 102 may be unable to connect to the communication network at a first time, since mobile device 102 does not have the password and/or user credentials to authenticate mobile device 102 with the network. Mobile device 102 may activate connection share application 108, which can access password data store 122 provided by connection share platform 120 via network 130. Connection share application 108 may search password data store 122 for the password and/or user credentials associated with the new communication network (e.g., by matching the communication network name with a stored network name and password data store 122, etc.). Once identified, connection share application 108 may provide the retrieved password and/or user credentials to the new communication network accessible via AP 140. The new communication network may authorize mobile device 102 to access the network at a second time, using this connection and submitted password and/or user credentials from password data store 122.

Connection share platform 120 may comprise an application programming interface (API) to receive requests for a password and/or user credentials associated with a communication network and respond with the requested information. Password data store 122 associated with connection share platform 120 may comprise the passwords and/or user credentials managed by connection share platform 120.

Network 130 may comprise a two-way communication network for transmitting signals that carry digital data streams representing various types of information. Additional information regarding network 130 and corresponding components is provided with FIG. 7.

AP 140 may comprise a processor and machine readable media (not shown for simplicity in explanation). AP 140 may connect directly to a wired local area network, typically Ethernet. AP 140 may provide wireless connections (e.g., using wireless LAN technology, etc.), typically Wi-Fi, for other devices to use that wired connection, including mobile device 102. AP 140 can support the connection of multiple wireless devices.

The traditional communication network illustrated in FIG. 1 may be insecure. For example, the password and/or user credentials may be stored in a password data store 122 at connection share platform 120 without knowledge of administrative users of the communication network. With the password and/or user credentials, any mobile device that downloads connection share application 108 may use it to access connection share platform 120. The password data store 122 may store password and/or user credentials for various Wi-Fi networks, such that the mobile device may submit a network identifier to connection share platform 120 and it can search password data store 122 for a matching entry. If a matching entry for a communication network is found in password data store 122, the mobile device may use the corresponding password and/or user credentials to gain access to the communication network. This offers little security for data that is transmitted via the communication network, since fraudsters may gain access to the communication network without the knowledge of administrative users of the communication network and can put the mobile device at an elevated risk of access by a fraudster.

Figure 2:
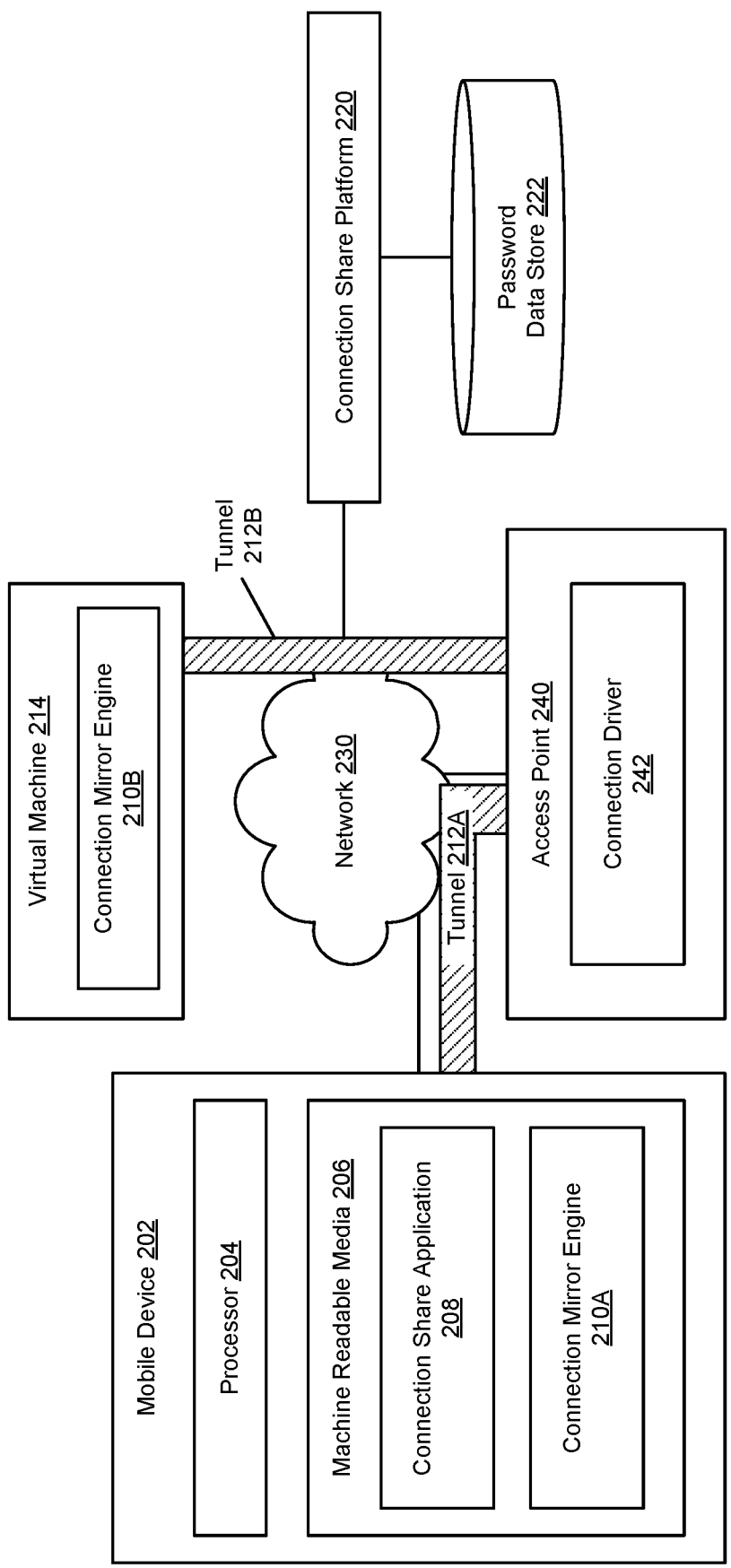
FIG. 2 provides an illustrative collection of devices in a communication network, in accordance with embodiments of the application.

FIG. 2 provides an illustrative collection of devices in a communication network, in accordance with embodiments of the application. For example, the collection of devices may communicate with each other to gain access to the communication network. Mobile device 202, processor 204, machine readable media 206, connection share platform 220, password data store 222, network 230, and AP 240 may comprise similar functionality as mobile device 102, processor 104, machine readable media 106, connection share platform 120, password data store 122, network 130, and AP 140 in FIG. 1, respectively. In some embodiments, virtual machine 214 may be implemented instead of or in addition to mobile device 202.

Mobile device 202 may comprise machine readable media 206 for storing one or more applications, including connection share application 208 and connection mirror engine (illustrated in FIG. 2 as connection mirror engine 210A when implemented with mobile device 202 and connection mirror engine 210B when implemented with virtual machine 214).

Connection share application 208 may be similar to connection share application 108 of FIG. 1. For example, when activated, connection share application 208 may access a password data store 222 associated with connection share platform 220 via a communication network, like network 230. The request and response protocol between connection share platform 220 and connection share application 208 may be embedded with connection share application 208 and executed by processor 204. Connection share application 208 may retrieve a password and/or user credentials associated with a communication network and provide the retrieved information to the network for authentication purposes.

Figure 3:
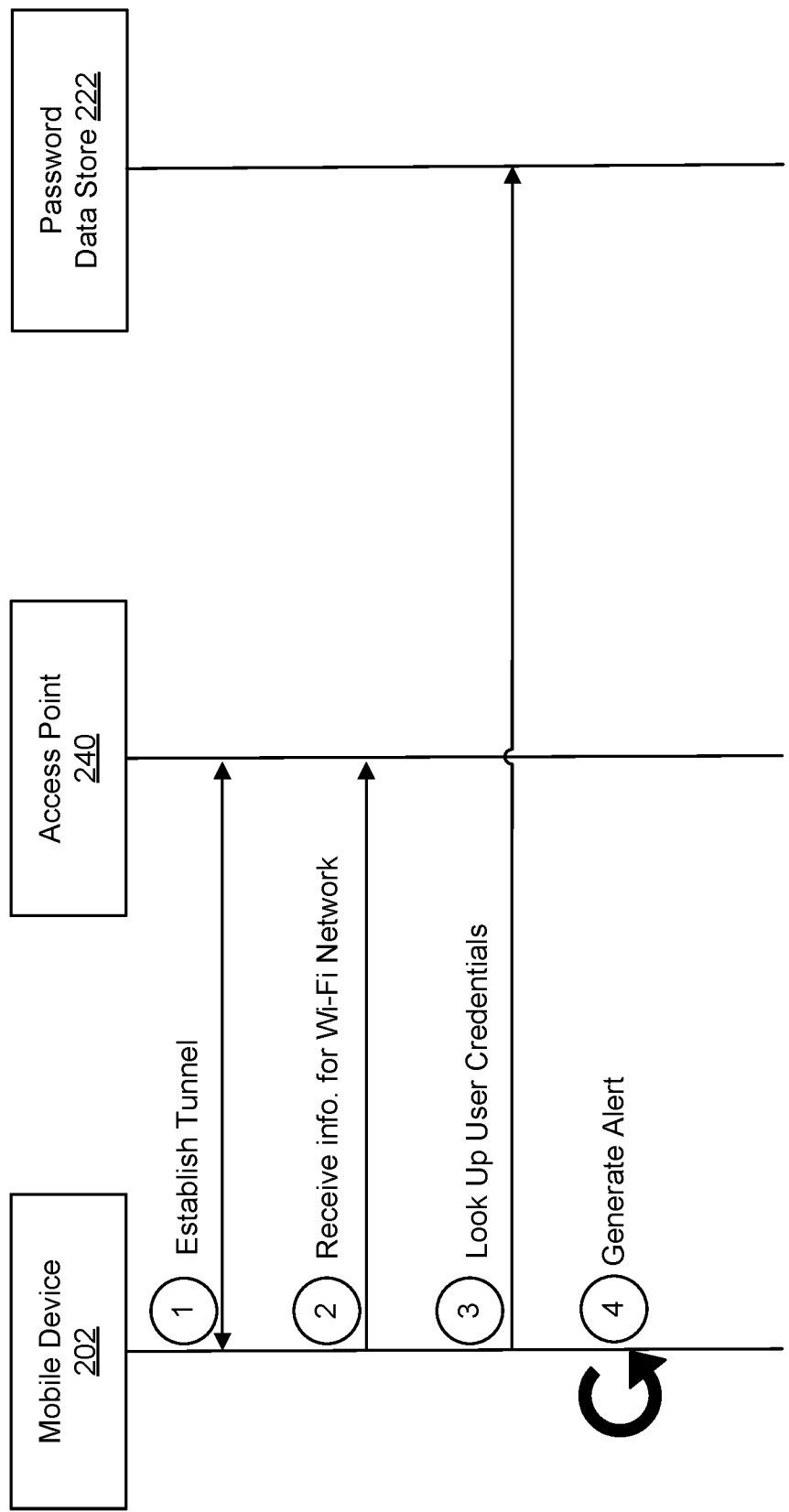
FIG. 3 illustrates communications between various devices in the network, in accordance with embodiments of the application.

An improved process is illustrated with FIG. 3 using at least some of the collection of devices illustrated in FIG. 2. For example, connection mirror engine 210A at mobile device 202 may establish a dedicated communication tunnel 212A with access point 240 at step 1. Tunnel 212A may be used to exchange wireless data packets between AP 240 and mobile device 202 prior to scanning for other local communication networks and/or connecting to another Wi-Fi network. The credentials to initiate tunnel 212A may be retrieved from connection mirror engine 210A. The data packets received at mobile device 202 may be scanned to identify information that is received by or transmitted from mobile device 202. At this point in time, mobile device 202 may not know the user credentials and/or password for AP 240 to connect to network 230 and only know the credentials to connect to tunnel 212A (e.g., using connection mirror engine 210A).

At step 2, mobile device 202 may receive information associated with one or more Wi-Fi networks. For example, mobile device 202 may scan for available Wi-Fi networks and identify a Wi-Fi network available through AP 240. This scan for available networks may identify local network 230. When identifying local network 230 through the scan, mobile device 202 may identify the network identifier for network 230 accessible through AP 240. Mobile device 202 may access network 230 through AP 240 as an authenticated device on the local network, in accordance with the IEEE 802.11 communication standard and further described with FIG. 4.

In another example, mobile device 202 may receive a network identifier for connecting to local network 230 or a remote network (not shown). When connecting to either network, the network identifier may identify the Wi-Fi network and user credentials/password may authenticate the mobile device 202 to access the Wi-Fi network.

Mobile device 202 may determine the login information for local network 230 using various methods. For example, mobile device 202 may provide the network identifier corresponding to local network 230 to connection share platform 220 see if the password data store 222 contains the login information for local network 230. Connection share platform 220 may return the login information if there is an identifier match. In another example, other mobile devices in the service set and/or local network 230 (e.g., via a mesh network or password sharing process) may provide the correct login credentials to local network 230.

In some examples, mobile device 202 can connect to local Wi-Fi network 230 with or without checking these credentials with shared credentials from connection share platform 220. For example, mobile device 202 can connect to a first Wi-Fi network using password and/or user credentials that are not retrieved from connection share platform 220 or a second Wi-Fi network using the password and/or user credentials that are retrieved from connection share platform 220. In this example, the first Wi-Fi network would not be identified as compromised and the second Wi-Fi network would be identified as compromised. A security alert may be generated for the second Wi-Fi network regarding a potential security leak of the second Wi-Fi network at step 4.

In addition to a standard connection to local network 230 via AP 240, mobile device 202 may also be used to check if other network credentials for remote or virtual networks are compromised. For example, in addition to determining a network identifier of local network 230 through a scan of the local networks (and identifying local network 230 associated with AP 240), mobile device 202 may also identify a Wi-Fi network that corresponds with a remote or virtual communication network identifier in excess of a threshold distance from mobile device 202. The remote or virtual communication network identifier may be provided from connection mirror engine 210A. Using the network identifier corresponding to a remote or virtual network may act as a network security check, initiated by mobile device 202 and transmitted through AP 240, to see if the password data store 222 contains login information for that remote network. Since the network identifier is remote from the physical location of mobile device 202, AP 240 may also assume that mobile device 202 may not receive the correct login credentials from other mobile devices in the service set and/or local network (e.g., via a mesh network or password sharing process) and the login credentials may originate from password data store 222, if at all.

In some examples, connection mirror engine 210A at mobile device 202 may provide the remote or virtual communication network identifier to connection share application 208. For example, the remote or virtual communication network may be accessible with a Wi-Fi network ID (e.g., BSSID, etc.), and the communication network is far away from mobile device 202 (e.g., in excess of a threshold distance from mobile device 202) such that the device is unlikely to discover this Wi-Fi network on its own. This remote or virtual communication network identifier may correspond with an actual Wi-Fi network that mobile device 202 is unlikely to discover on its own, or the remote or virtual communication network identifier may correspond with a fake Wi-Fi network. Either instance may help identify the remote or virtual communication network identifier as a flag for detecting a leaked security credential that may be stored in the password data store 222.

At step 3, mobile device 202 may look up a password and/or user credentials corresponding with the remote or virtual communication network from connection share platform 220. For example, connection share application 208 may transmit the remote or virtual communication network identifier to connection share platform 220. Connection share platform 220 may match the network identifier with a stored network identifier in password data store 222 and retrieve a password and/or user credentials associated with the remote or virtual communication network.

If the password and/or user credentials are found in password data store 222, connection mirror engine 210A can confirm that the password and/or user credentials have been compromised for the communication network (e.g., by matching a pre-existing network identifier stored in password data store 222, etc.). For example, an assumption may be made that the user credentials have been leaked by a second mobile device with secured access to the remote or virtual communication network (e.g., stored in a password data store of the application) and the network identifier and user credentials/password have been provided to password data store 222 to share with other mobile devices. As such, by finding a matching network identifier for the remote or virtual communication network, a potential security risk exists for that network.

The network connection application at mobile device 202 can also save the password and/or user credentials to a Wi-Fi profile or configuration file. In some examples, the operating system can include a daemon (e.g., sometimes called "supplicant") that can use the information to authenticate with the Wi-Fi network.

Connection mirror engine 210A can also provide the retrieved password and/or user credentials to an authentication server associated with the local network 230. The retrieved information may correspond with a compromised communication network when the retrieved information satisfies the authentication requirements needed to connect mobile device 202 with the local network 230 (in the instance that mobile device 202 was physically located near the network to establish a connection, etc.).

Connection driver 242 may be a software component incorporated with AP 240 that gives AP the ability to interact with connection mirror engine 210A. When a VM is implemented to connect mobile device 202 with AP 240, connection driver 242 may enable the connection between AP 240 and the VM provided by mobile device 202, as illustrated with FIG. 5. In some examples, connection driver 242 may electronically distribute the protocol for transferring the information between AP 240 and mobile device 202. In some examples, connection driver 242 may redirect data packets to the tunnel 212A between mobile device 202 and AP 240.

In some examples, connection mirror engine 210A may mirror all packets from AP 240 that are received via the dedicated communication tunnel. For example, connection mirror engine 210A may capture data traffic and packet data, including payloads and headers, ingress and egress, that is transferred via tunnel 212A. In some examples, the data traffic or packet data may be filtered or selected based on matching a classification filter, causing a subset of data to be captured or analyzed. In some examples, connection mirror engine 210A may execute an instruction to mirror all packets from AP 240 to the dedicated tunnel and store them locally at mobile device 202 (or some other storage device) or remotely. In some examples, connection driver 242 may capture the data and transmit it to connection mirror engine 210A.

In some examples, connection mirror engine 210A may inject all packets from mobile device 202 to connection driver 242 (e.g., a Wi-Fi driver) of AP 240 with the user credentials or password information. For example, the injection by mobile device 202 may include information added to one or more data packets transferred via tunnel 212A to AP 240. In some examples, the data packets may be injected into a Wi-Fi driver at mobile device 202 or a Wi-Fi driver at AP 240 in order to analyze information in the data packet and/or determine user credentials/passwords that may have been transmitted between connection share platform 220 and AP 240 or mobile device 202.

In some examples, a controller may help manage or direct the flow of data between AP 240 and mobile device 202. For example, the controller may be operable to configure and/or manage network devices, including AP 240, switches, routers, other access points, and/or receiving station (STA) connected to network 230. Controller may provide management the functionality of AP 240 as an AP controller.

At step 4, connection mirror engine 210A can generate an alert. The alert can be sent to a network administrator of the communication network (e.g., to perform an action, etc.). The action may include, for example, changing the user credentials (e.g., passphrase, etc.), removing access from one or more users, and the like. In some examples, the communication network identifier may be stored with a flag identifying that credentials associated with the communication network have been compromised.

Figure 4:
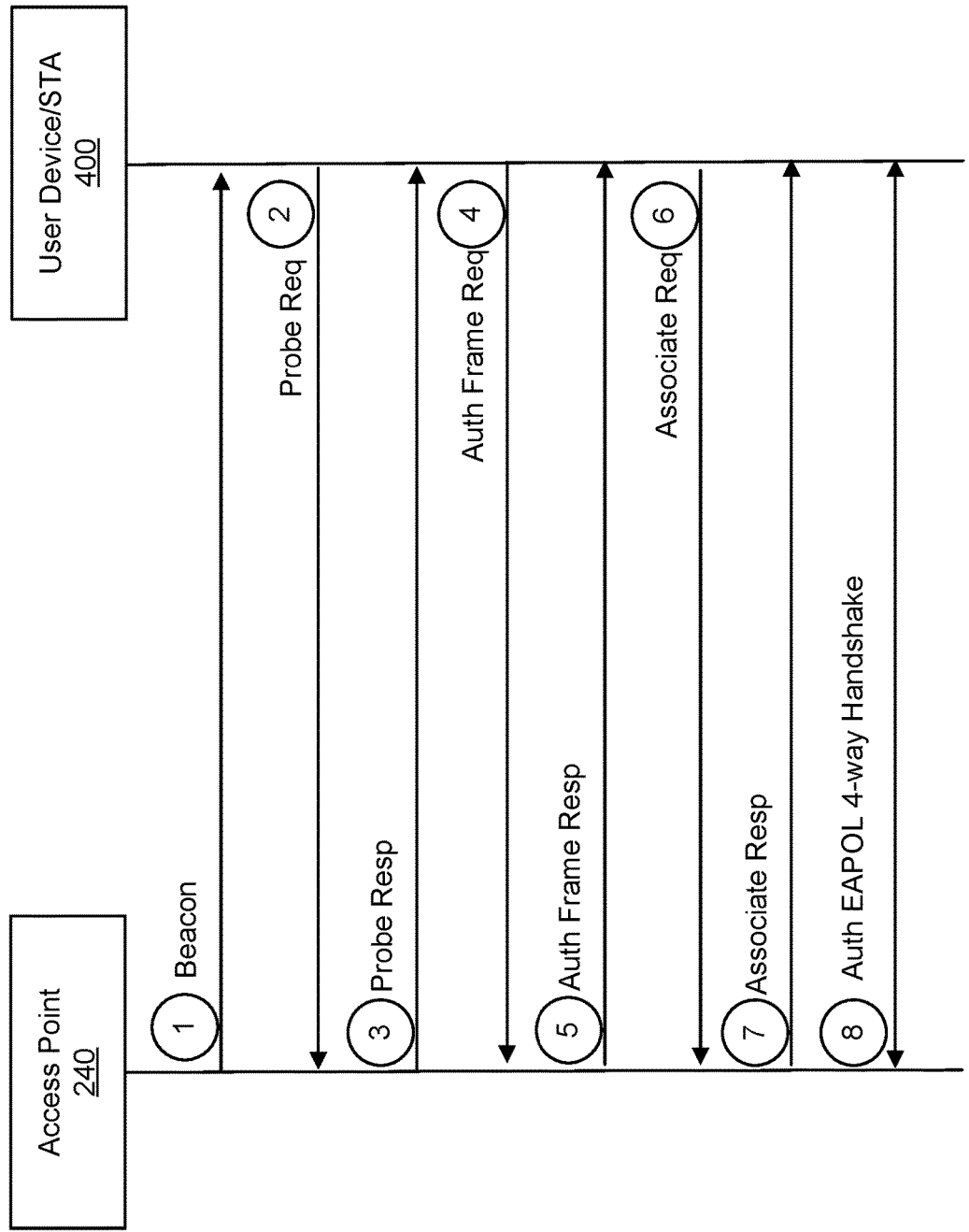
FIG. 4 illustrates communications between various devices in the network, in accordance with embodiments of the application.

FIG. 4 illustrates a frame interaction between the AP and a station for a Wi-Fi network. A sample station (STA) 400 may correspond with mobile device 202 illustrated in FIG. 2. The example is based on IEEE 802.11 for illustrative purposes, which is implemented as Wi-Fi Protected Access II (WPA2), although any relevant implementation may be performed within the scope of this disclosure.

At step 1, AP 240 sends a beacon frame to the station (STA) 400. The beacon frame may serve to announce the presence of a wireless LAN and to synchronize the members of the service set (e.g., mobile device 202 and other mobile devices, etc.). The contents of the beacon frame may comprise, for example, an 802.11 MAC header, body (e.g., timestamp, beacon interval between beacon transmissions, capability information, SSID, etc.), and frame check sequence (FCS). The beacon frame may be sent or broadcast periodically or on a predetermined interval of time.

In some examples, the beacon may correspond with a management frame in IEEE 802.11-based WLAN networks. The beacon may contain information about the network and help synchronize the device members of a service set and help other devices in the service set connect to the local network. In some examples, credentials associated with the remote or virtual communication network may not be shared with other device members.

The service set may correspond with wireless devices in a geographic area that can communicate with each other through a common medium. In this example, the common medium may be AP 240 and mobile device 202 (as illustrated in FIG. 2) may communicate with other mobile devices (not shown) using AP 240. AP 240 can allow these wireless devices to connect to a wired network and start communicating with each other (e.g., to share login credentials or passwords, etc.).

At step 2, STA 400 sends probe request to discover AP 240.

At step 3, AP 240 replies with probe response.

At step 4, STA 400 sends an authentication frame to AP 240.

At step 5, AP 240 replies with authentication frame.

At step 6, STA 400 sends associate request frame to AP 240.

At step 7, AP 240 replies with associate response.

At step 8, an authentication process and/or 4-way handshake is carried out. For example, the authentication process may follow an EAP exchange through 802.1X (known as "EAPOL") to help ensure that STA 400 is authenticated with AP 240.

Figure 5:
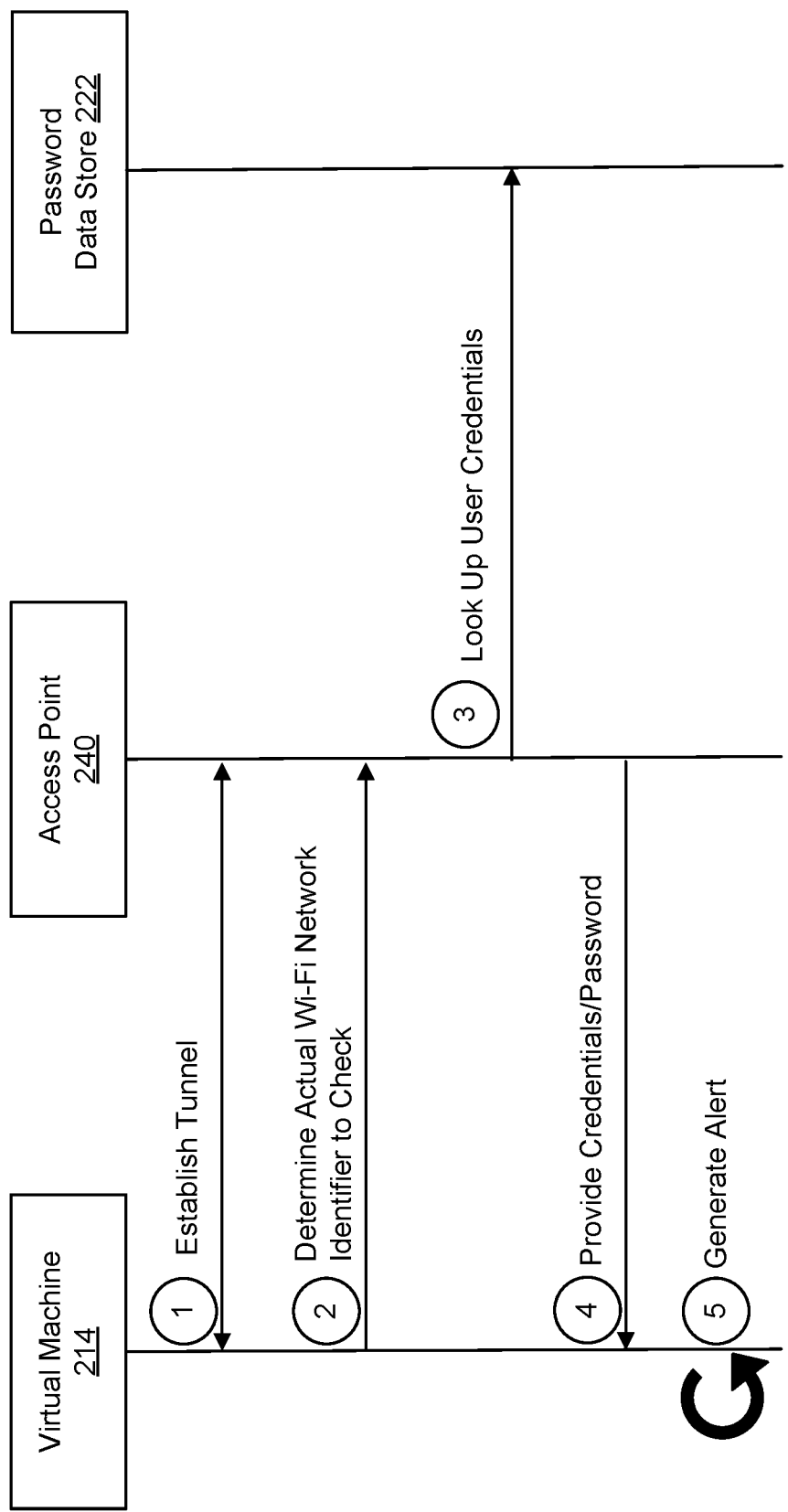
FIG. 5 illustrates communications between various devices in the network, in accordance with embodiments of the application.

An improved process using a VM is illustrated with FIG. 5 using at least some of the collection of devices illustrated in FIG. 2. For example, connection mirror engine 210B at VM 214 may establish a dedicated communication tunnel 212B with access point 240 at step 1. Tunnel 212B may be used to exchange wireless data packets between AP 240 and VM 214. The credentials to initiate tunnel 212B may be retrieved from connection mirror engine 210B.

Connection driver 242 may be a software component incorporated with AP 240 that gives AP the ability to interact with connection mirror engine 210B. In some examples, connection driver 242 may electronically distribute the protocol for transferring the information between AP 240 and VM 214. In some examples, connection driver 242 may direct data packets to tunnel 212B between VM 214 and AP 240.

At step 2, VM 214 may check if network credentials are compromised, irrespective of the physical location of VM 214 or AP 240. For example, VM 214 may identify a Wi-Fi network identifier associated with an actual Wi-Fi communication network and provide it from connection mirror engine 210A to AP 240 via tunnel 212B.

At step 3, AP 240 may transmit the Wi-Fi network identifier to connection share platform 220 and/or password data store 222. Using the network identifier, connection share platform 220 may match the received network identifier with a stored network identifier in password data store 222 and retrieve a password and/or user credentials associated with the communication network. Connection share platform 220 may provide the password and/or user credentials associated with the communication network to AP 240 (or directly to VM 214) via network 230. AP 240 may pass the password and/or user credentials to VM 214 via tunnel 212B.

At step 4, VM 214 may receive the password and/or user credentials from AP 240. When VM 214 receives the password and/or user credentials associated with the communication network, VM 214 may assume that the communication network is compromised. In other words, by finding a match, the password and/or user credentials associated with the communication network may be assumed to be leaked by a second mobile device (and stored in the password data store 222 for other mobile devices to retrieve without security credentials for the network from the authentication source for the network).

At step 5, connection mirror engine 210B at VM 214 can generate an alert. The alert can be sent to a network administrator of the communication network (e.g., to perform an action, etc.). The action may include, for example, changing the user credentials (e.g., passphrase, etc.), removing access from one or more users, and the like. In some examples, the communication network identifier may be stored with a flag identifying that credentials associated with the communication network have been compromised.

Figure 6:
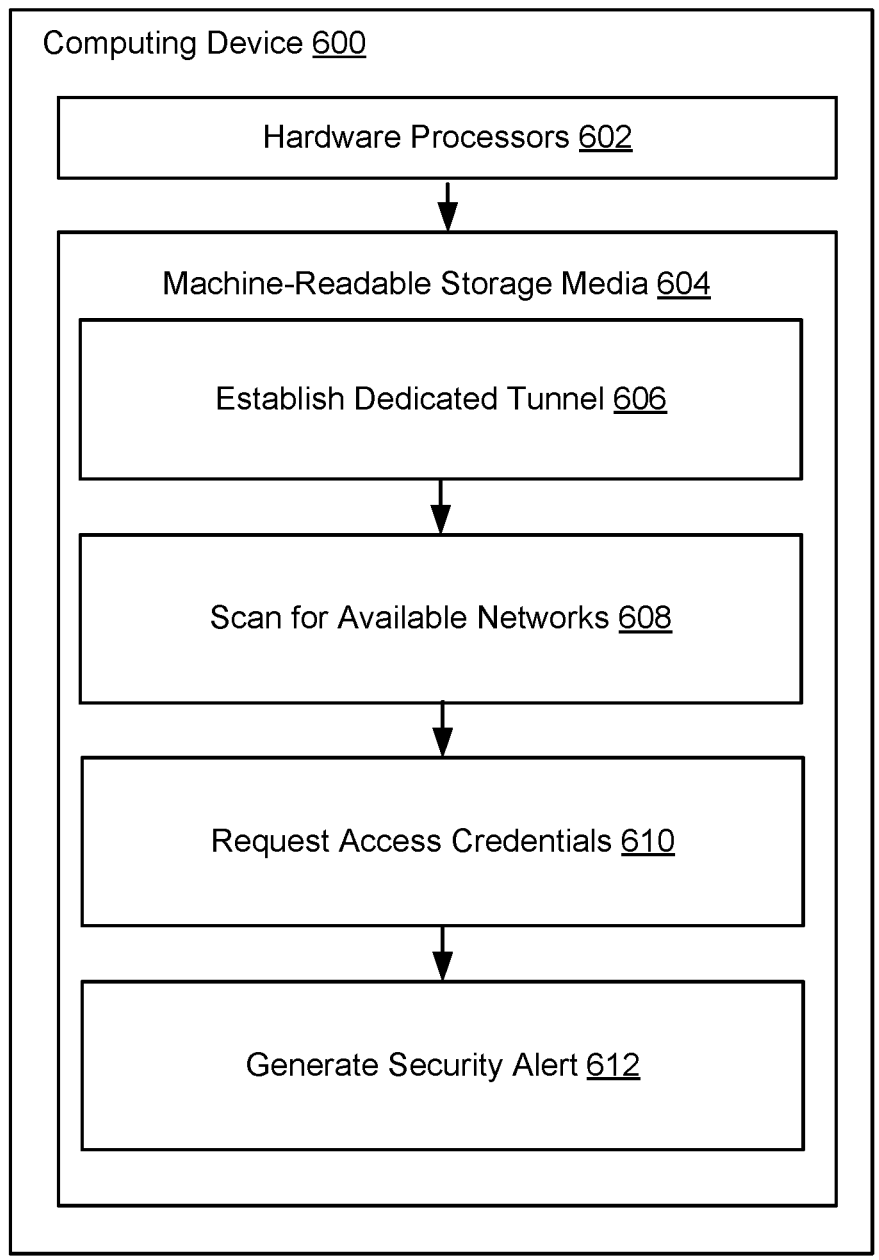
FIG. 6 illustrates a computing component for providing a detection and defense system relating to a network connection sharing application, in accordance with embodiments of the application.

FIG. 6 illustrates an example iterative process performed by a computing device 600 for providing a detection and defense system relating to a network connection sharing application. Computing device 600 may be, for example, a server computer, a controller, or any other similar computing component capable of processing data. In the example implementation of FIG. 6, the computing device 600 includes a hardware processor 602, and machine-readable storage medium 604. In some embodiments, computing device 600 may be an embodiment of a system corresponding with mobile device 202 or VM 214 of FIG. 2. Hardware processor 602 and machine-readable storage medium 604 may be embodiments of processor 204 and machine readable media 206 of FIG. 2, respectively.

Hardware processor 602 may fetch, decode, and execute instructions, such as instructions 606-612, to control processes or operations for optimizing the system during runtime. As described in detail below, machine-readable storage medium 604 may be encoded with executable instructions, for example, instructions 606-612.

Hardware processor 602 may execute instruction 606 to establish a dedicated tunnel. For example, computing device 600 may establish the dedicated tunnel between an access point of a first Wi-Fi network and the computing device. The dedicated tunnel may be used to exchange wireless data packets between AP and the computing device prior to scanning for other local communication networks and/or connecting to a second Wi-Fi network. The computing device may be a mobile device, user device, or a virtual machine (VM) executed on a remote server computer.

Hardware processor 602 may execute instruction 608 to receive information associated with a Wi-Fi network. For example, computing device 600 may receive a remote or virtual network identifier associated with the second Wi-Fi network.

Hardware processor 602 may execute instruction 610 to look up or request access credentials. For example, computing device 600 may request access credentials to the second Wi-Fi network from a connection share platform. In some embodiments, either the computing device or the VM attempts to establish a network connection to an access point (AP) using the shared user credentials over a dedicated communication tunnel established between the AP and computing device/VM.

Hardware processor 602 may execute instruction 612 to generate a security alert. For example, computing device 600 may, upon connecting to the second Wi-Fi network using the access credentials, generate the security alert regarding a potential security leak of the second Wi-Fi network. The alert can be sent to a network administrator of the second Wi-Fi network. Other actions may be performed in some embodiments. The action may include, for example, changing the user credentials (e.g., passphrase, etc.), removing access from one or more users, and the like. In some examples, the communication network identifier may be stored with a flag identifying that credentials associated with the communication network have been compromised.

In some examples, hardware processor 602 may execute an instruction to mirror all packets from the access point to the dedicated tunnel. In some examples, all packets from the computing device may be injected to a Wi-Fi driver of the access point.

In some examples, hardware processor 602 may execute an instruction to inject all packets from the computing device to a Wi-Fi driver of the access point. The Wi-Fi driver of the access point may be similar to connection driver 242 of FIG. 2.

In some examples, the remote or virtual communication network identifier corresponds with a communication network in excess of a threshold distance from computing device.

In some examples, the connection to the second Wi-Fi network uses the access credentials generates an assumption that the access credentials associated with the second Wi-Fi network have been compromised.

In some examples, first access credentials associated with the first Wi-Fi network are received from other computing devices in a service set, and second access credentials associated with the second Wi-Fi network are received via the dedicated tunnel.

Computing device 600 may correspond with various network devices that can communicate via a Wi-Fi network. For example, computing device 600 may be a virtual machine or a mobile device.

Figure 7:
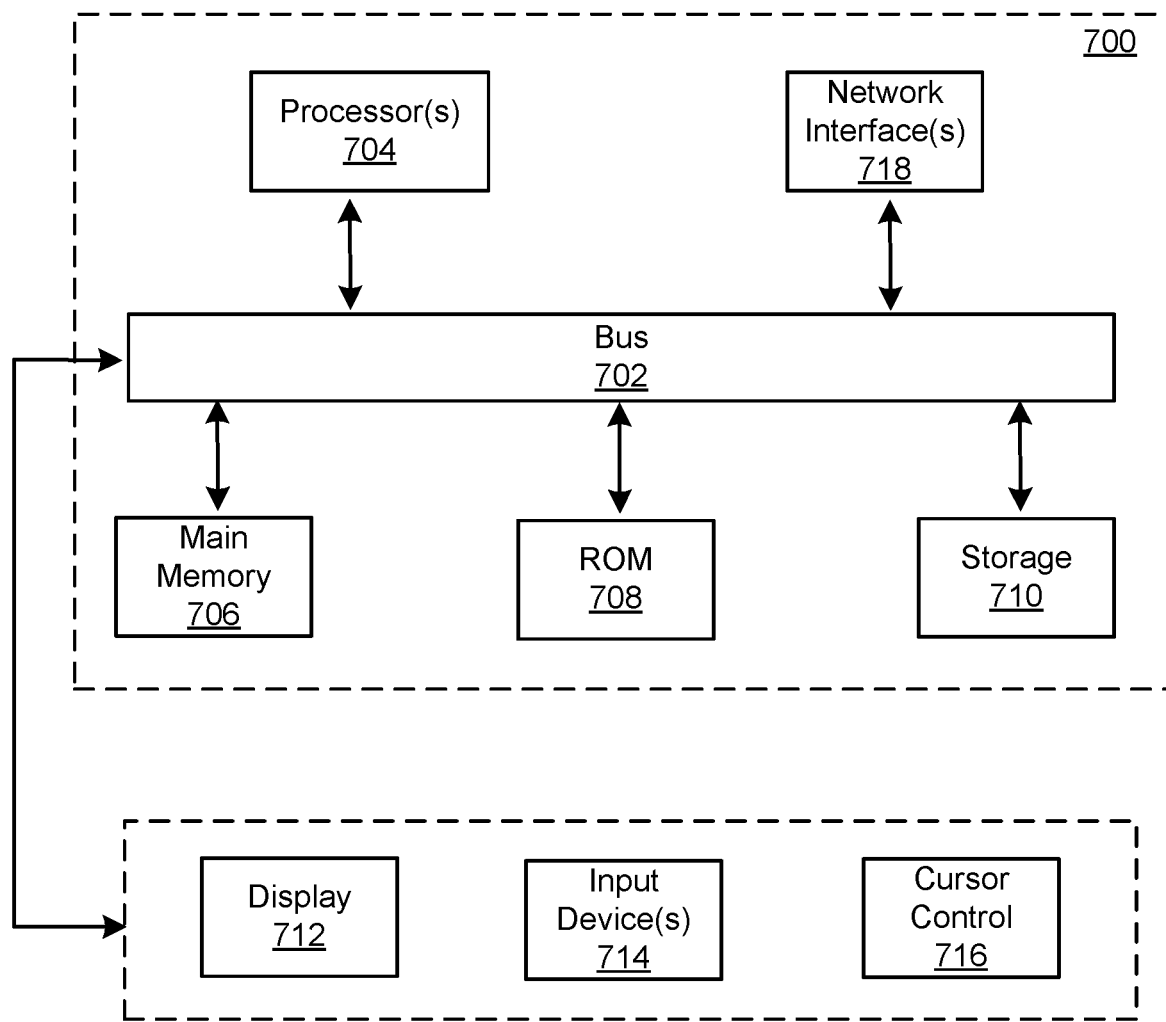
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," "device," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer-readable storage medium comprising instructions that upon execution cause one or more processors of a mobile device to:
    establish a dedicated communication tunnel between an access point and the mobile device;
    as part of a process to detect leaked access credentials:
        provide, to a connection share application in the mobile device, a remote or virtual network identifier associated with a Wi-Fi network that is a remote Wi-Fi network or a fake Wi-Fi network, to cause the connection share application to request access credentials to the Wi-Fi network from a connection share platform; and
        in response to receiving, based on the request from the connection share application, the access credentials from the connection share platform via the dedicated communication tunnel, generate a security alert regarding a potential security leak of the Wi-Fi network.

2. The non-transitory computer-readable storage medium of claim 1, wherein the instructions upon execution cause the one or more processors of the mobile device to:
    receive packets from the access point that were redirected by the access point to the dedicated communication tunnel; and
    analyze the received packets to detect the access credentials from the connection share platform.

3. The non-transitory computer-readable storage medium of claim 2, wherein the instructions upon execution cause the one or more processors of the mobile device to:

inject packets from the mobile device to a Wi-Fi driver of the access point.

4. The non-transitory computer-readable storage medium of claim 1, wherein the remote or virtual network identifier associated with the Wi-Fi network is transmitted via the dedicated communication tunnel to the access point.

5. The non-transitory computer-readable storage medium of claim 1, wherein the remote or virtual network identifier is associated with the remote Wi-Fi network that is in excess of a threshold distance from the mobile device such that the remote Wi-Fi network is unlikely to be discovered by the mobile device based on a scan for available Wi-Fi networks by the mobile device.

6. The non-transitory computer-readable storage medium of claim 1, wherein the receiving of the access credentials from the connection share platform is indicative of the access credentials being stored in a credential data store by an entity different from the mobile device.

7. A mobile device comprising:
a processor; and
a non-transitory computer-readable storage medium storing instructions executable on the processor to:
establish a dedicated communication tunnel between an access point and the mobile device;
as part of a process to detect leaked access credentials:
provide, to a connection share application in the mobile device, a remote or virtual network identifier associated with a Wi-Fi network that is a remote Wi-Fi network or a fake Wi-Fi network, to cause the connection share application to request access credentials to the Wi-Fi network from a connection share platform; and
in response to receiving, based on the request from the connection share application, the access credentials from the connection share platform via the dedicated communication tunnel, generate a security alert regarding a potential security leak of the Wi-Fi network.

8. The mobile device of claim 7, wherein the remote or virtual network identifier is provided from a virtual machine in the mobile device to the connection share application.

9. The mobile device of claim 7, wherein the remote or virtual network identifier is provided from defense instructions in the mobile device to the connection share application, and wherein the generating of the security alert is by the defense instructions.

10. The mobile device of claim 7, wherein the remote or virtual network identifier is associated with the remote Wi-Fi network that is in excess of a threshold distance from the mobile device such that the remote Wi-Fi network is unlikely to be discovered by the mobile device based on a scan for available Wi-Fi networks by the mobile device.

11. A computer-implemented method comprising:
establishing, by a mobile device, a dedicated communication tunnel between an access point and the mobile device;
as part of a process to detect leaked access credentials:
providing, to a connection share application in the mobile device, a remote or virtual network identifier associated with a Wi-Fi network that is a remote Wi-Fi network or a fake Wi-Fi network, to cause the connection share application to request access credentials to the Wi-Fi network from a connection share platform; and
in response to receiving, based on the request from the connection share application, the access credentials from the connection share platform via the dedicated communication tunnel, generating a security alert regarding a potential security leak of the Wi-Fi network.

12. The computer-implemented method of claim 11, wherein the remote or virtual network identifier is provided from a virtual machine in the mobile device to the connection share application.

13. The computer-implemented method of claim 11, wherein the remote or virtual network identifier is provided from defense instructions in the mobile device to the connection share application, and wherein the generating of the security alert is by the defense instructions.

14. The computer-implemented method of claim 11, wherein the remote or virtual network identifier is associated with the remote Wi-Fi network that is in excess of a threshold distance from the mobile device such that the remote Wi-Fi network is unlikely to be discovered by the mobile device based on a scan for available Wi-Fi networks by the mobile device.

15. The computer-implemented method of claim 11, wherein the potential security leak of the Wi-Fi network comprises a potential security leak of the access credentials used for connecting to the Wi-Fi network.

16. The computer-implemented method of claim 11, comprising:
receiving, at the mobile device, packets from the access point that were redirected by the access point to the dedicated communication tunnel; and
analyzing, by the mobile device, the received packets to detect the access credentials from the connection share platform.

17. The non-transitory computer-readable storage medium of claim 1, wherein the remote or virtual network identifier is provided from a virtual machine in the mobile device to the connection share application.

18. The non-transitory computer-readable storage medium of claim 1, wherein the remote or virtual network identifier is provided from defense instructions in the mobile device to the connection share application, and wherein the generating of the security alert is by the defense instructions.

19. The non-transitory computer-readable storage medium of claim 1, wherein the potential security leak of the Wi-Fi network comprises a potential security leak of the access credentials used for connecting to the Wi-Fi network.

* * * * *